United States Patent [19]

Kensinger et al.

[11] 4,347,576
[45] Aug. 31, 1982

[54] LOAD MANAGEMENT CONTROL APPARATUS WITH IMPROVED DUTY CYCLE OPERATION

[75] Inventors: Robert A. Kensinger, Dakota County; Robert N. Norman, Hennepin County, both of Minn.

[73] Assignee: Honeywell Inc., Minneapolis, Minn.

[21] Appl. No.: 144,495

[22] Filed: Apr. 28, 1980

[51] Int. Cl.³ .................. G06F 15/56; H02J 13/00
[52] U.S. Cl. .................. 364/493; 364/200; 307/39
[58] Field of Search .......... 364/492, 493, 200; 307/39, 35, 41, 52, 62

[56] References Cited

U.S. PATENT DOCUMENTS

| | | | |
|---|---|---|---|
| 3,925,680 | 12/1975 | Dixon | 307/39 |
| 4,071,745 | 1/1978 | Hall | 364/557 X |
| 4,125,782 | 11/1978 | Pollnow, Jr. | 364/493 X |
| 4,136,392 | 1/1979 | Westphal et al. | 364/492 |
| 4,146,923 | 3/1979 | Borkan | 364/492 X |
| 4,189,776 | 2/1980 | Kendall | 307/41 X |
| 4,206,872 | 6/1980 | Levine | 165/12 X |
| 4,216,384 | 8/1980 | Hurley | 307/39 |
| 4,228,511 | 10/1980 | Simcoe et al. | 364/493 X |
| 4,245,319 | 1/1981 | Hedges | 364/493 |

Primary Examiner—Edward J. Wise
Attorney, Agent, or Firm—Clyde C. Blinn

[57] ABSTRACT

A load management control apparatus with an improved duty cycle operation has a programmed means to control the off time for a selected interval of time for several loads. The total percentage of off time of the loads being controlled is summed and the total integer is used by a sequential operational means to maintain that number of load off at all times even if loads which are off on demand limit control are included to make the number.

11 Claims, 28 Drawing Figures

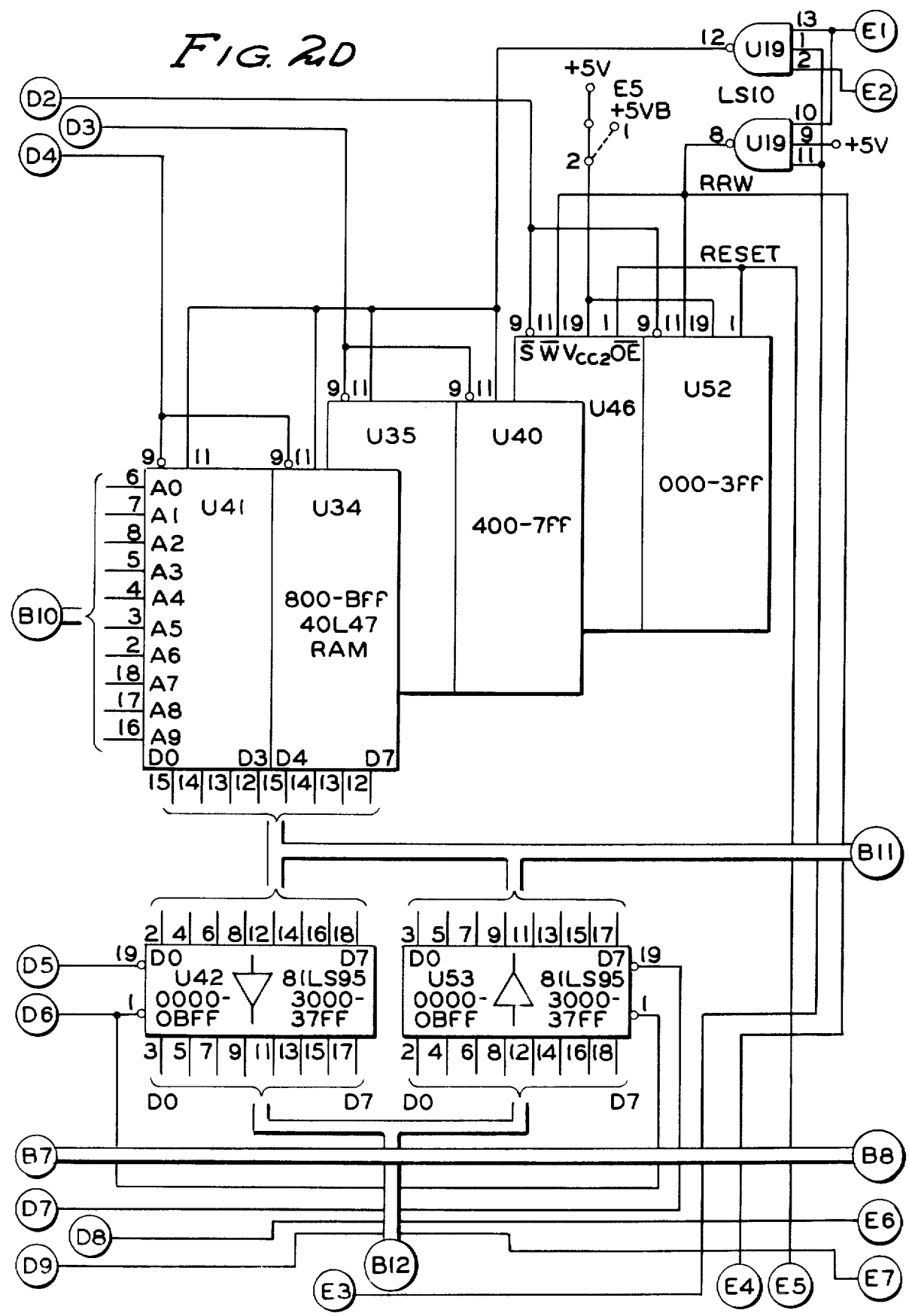

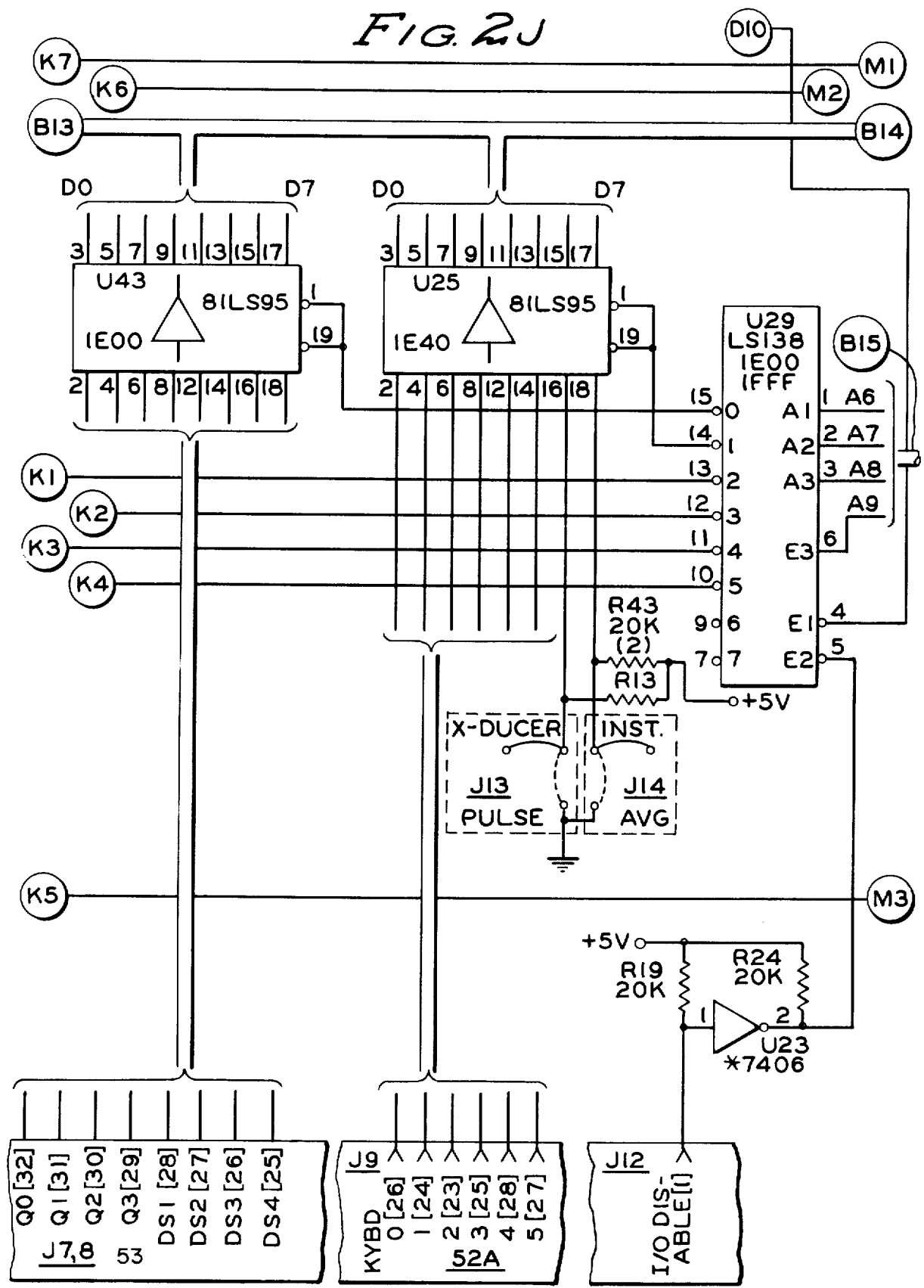

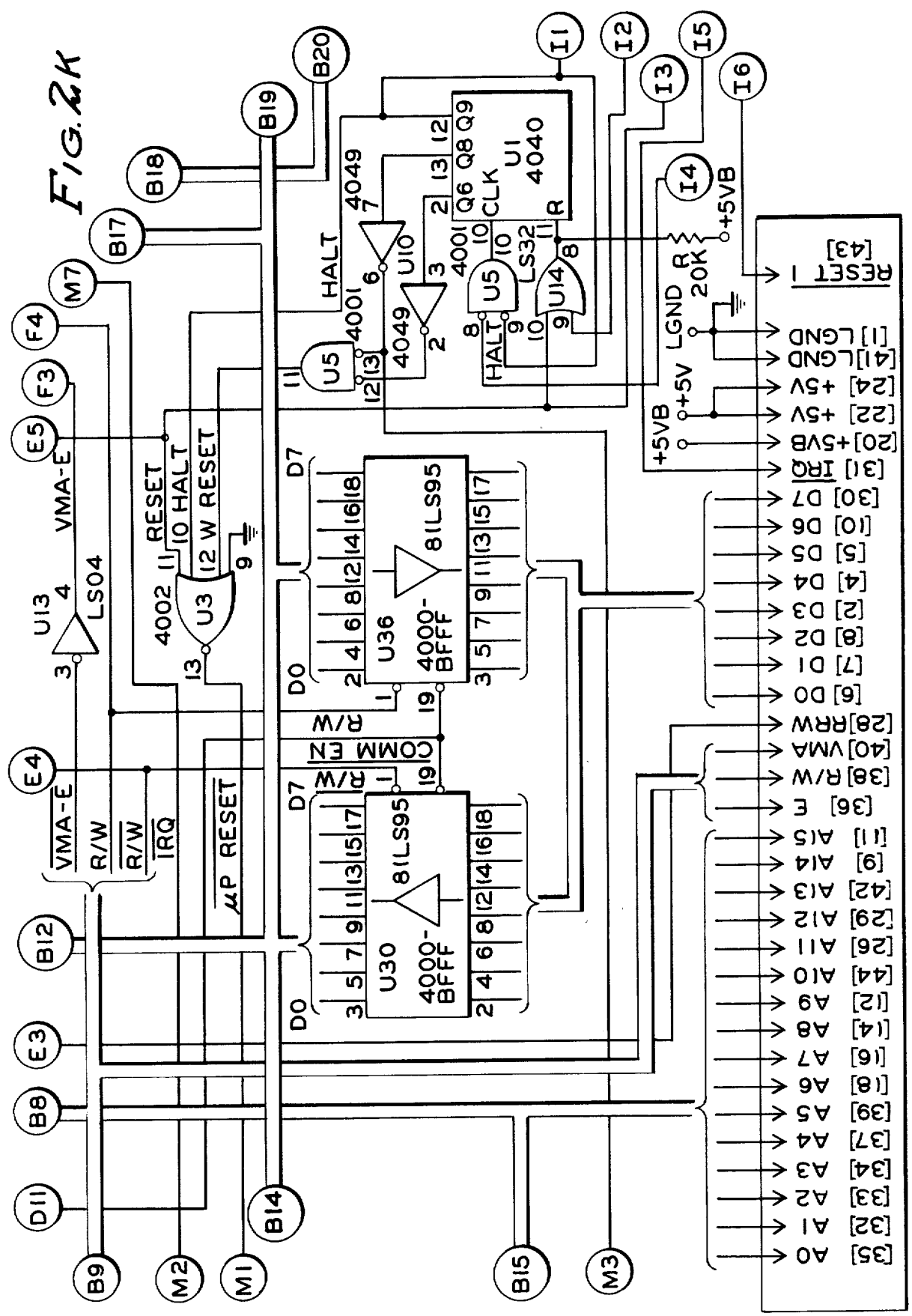

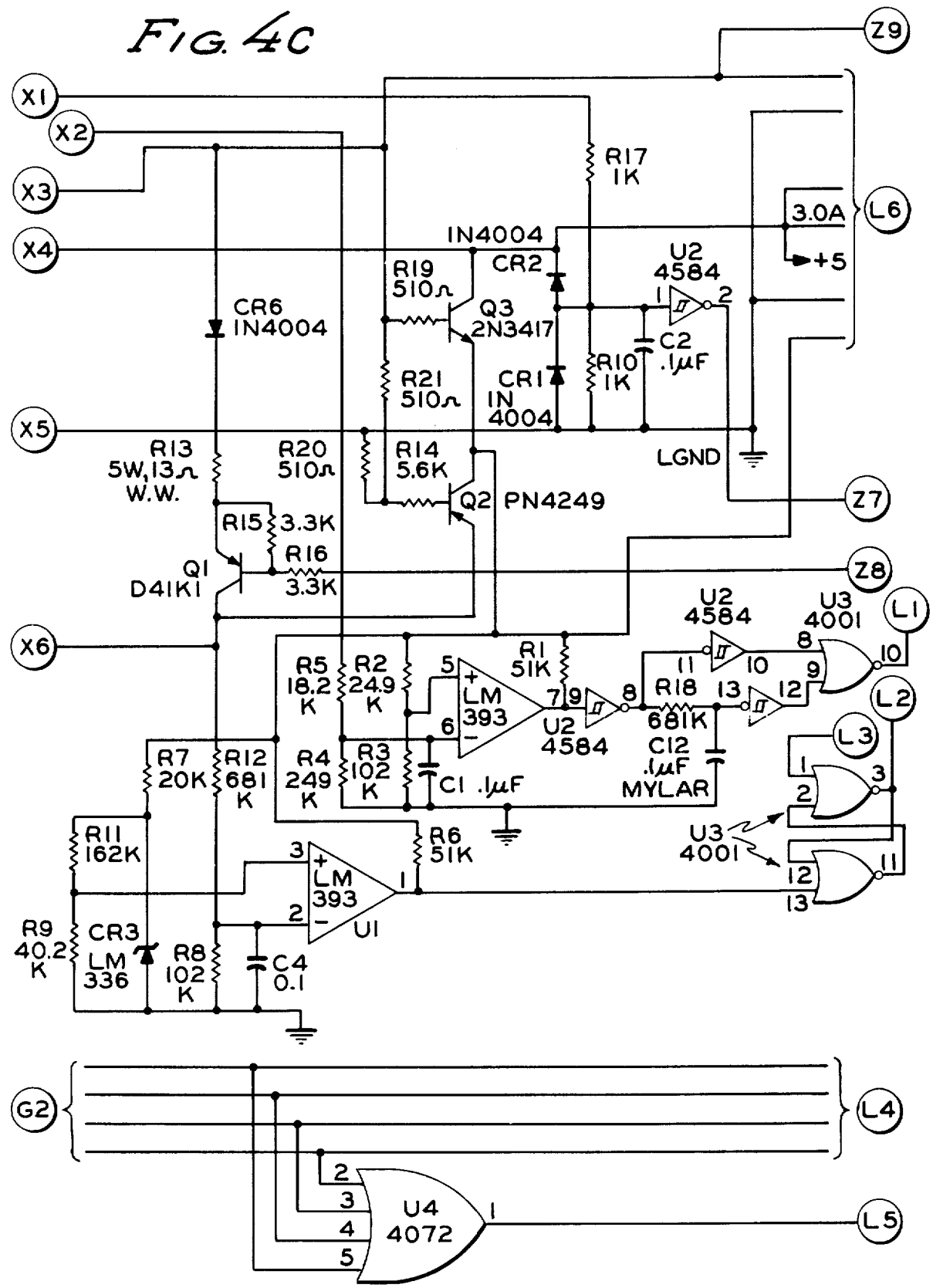

| U NO. | TYPE | +5V | +5VB | +5AV | -5AV | LGND | AGND | DE-COUPL CAP. |
|---|---|---|---|---|---|---|---|---|
| U1 | LM393 | | 8 | | | 4 | | C3 |
| U2 | 4584 | | 14 | | | 7 | | C7 |
| U3 | 4001 | | 14 | | | 7 | | C8 |
| U4 | 4072 | | 14 | | | 7 | | C17 |
| U5 | 4011 | | 14 | | | 7 | | C19 |
| U6 | 14433 | | | 24 | 12 | | 13 | C12,26 |
| U7 | 1403 | | | 1 | | | 3 | C22 |
| U8 | 4052 | | | 16 | | | 7,8 | C23 |

LOAD MANAGEMENT CONTROL APPARATUS WITH IMPROVED DUTY CYCLE OPERATION

BACKGROUND OF THE INVENTION

Field of the Invention: Load manangement control apparatus and systems have been used in one form or another for many years. Such systems typically have three general modes of control which can be applied to electrical loads connected to the apparatus in order to realize monetary and energy savings. These general modes of control are: duty cycle control, time of day control and demand limit control. While each of these general modes is quite commonly known to one skilled in the art, the use of such an energy management system is described in an article entitled, "*How To Use PCs for Energy Management Systems,* in Control Engineering of February 1979, pages 39 to 41.

The particular mode of control entitled Duty Cycle Control provides for the programming of the off time of a particular time interval for each of the loads connected to the apparatus to reduce the operational or duty cycle of the load even though certain control apparatus associated with the load may call for its operation, in an effort to realize the monetary and energy savings. Once a duty cycle is established by the programming means the loads are sequenced and each load is turned off during the selected time period of its interval of operation to reduce electrical consumption.

The duty cycle control compensates for certain inherent system inefficiencies which cause excessive cooling or heating conditions such as the problem of placing thermostats too close or too far away from their thermal sources. A building manager may choose to duty cycle certain loads to assure that these loads are operated with a minimum amount of electrical power to reduce the overall electrical power consumption of his installation.

DESCRIPTION OF THE PRIOR ART

In the prior art duty cycle control, of a number of loads were connected to a load management control apparatus or in a system, the programmed on and off times for the loads are selected and the loads are controlled in a sequential manner to stagger their operation to maintain a certain number of loads on at any one time. Such a duty cycle control by a sequential time cycle results in erratic electrical power demands as the number of loads being controlled at any one time has no relationship to the amount of off time of the particular loads. Such duty cycle control is accomplished in the W970 sold by Honeywell Inc. and shown in Instruction Sheet #60-2404 8-76.

SUMMARY OF THE INVENTION

The present invention is concerned with a load management control apparatus or system and in particular an improved duty cycle control apparatus. When a plurality of loads connected to the outputs of the control apparatus are programmed to be controlled with a duty cycle having a predetermined percentage of off time for the interval of operation of each of the loads, means is provided for totaling the percent of off time of all the loads under control at a particular moment by the duty cycler and the energy obtained from totaling the percentage of off time of each load is used by the programmer to maintain that number of loads off at all times. As the load management apparatus cycles the loads connected to the output in a sequential manner, the sequential operation will be controlled to maintain the number of loads off at all times depending upon the total percentage of loads scheduled to be off.

DESCRIPTION OF THE PREFERRED EMBODIMENT

Figure 3:
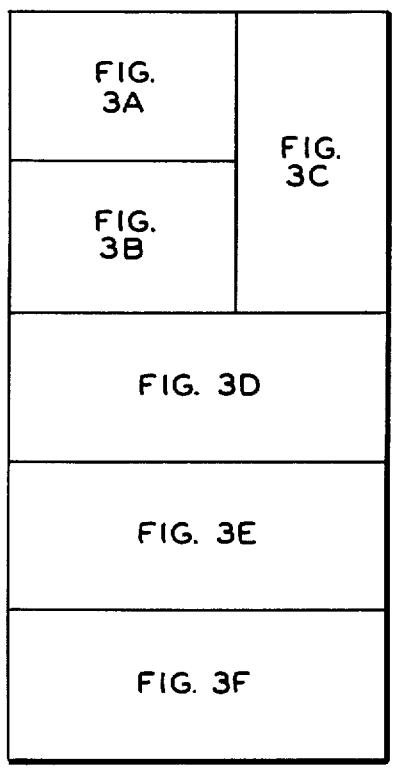
FIG. 3 which is a composite of FIGS. 3A to 3F, is a circuit diagram of the display shown on the front panel as disclosed in FIG. 1, FIG. 4 which is a composite of FIGS. 4A to 4E, is a circuit diagram of the power supply and analogue to digital converter for the various sensors connected to the load management control panel of FIG. 1.
Figure 4:
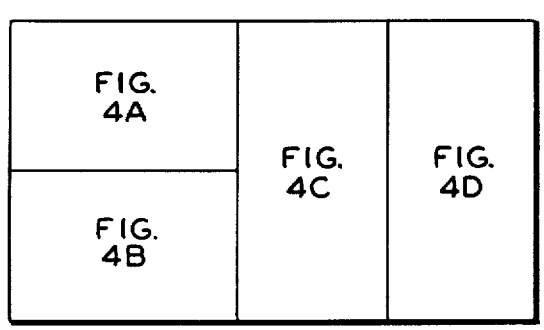
Figure 4:
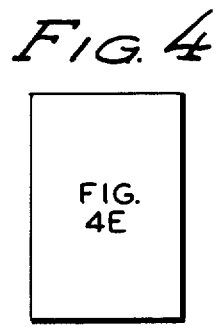

Referring to FIG. 1, a load management control apparatus or panel for a load management system is shown. The Panel 10 has a front cover 11 on which various switches, instructions, lights, and indicating means are mounted for use in programming the load management system for the general modes of operation including the duty cycle control, time of day control, and demand limit control. An input keyboard panel 12 and special input keyboard switches 16 are used for programming the apparatus depending upon what type of mode of operation is to be changed. The visual display shown at 13 contains a number of light emitting diodes (LED) or visual display units each of which containing seven segments for providing a visual output of any data which is to be placed into the program or already therein. The circuit for the visual display 13 is shown in FIG. 3 to be explained later.

The panel contains a timer or clock and has a clock set switch at 14 for setting the date, that is, year, month, day and time of the clock from the input panel 12. As the input is entered into the panel 12 the input is displayed at 13 as it moves across from left to right. The indicator 15 which is shown associated with the year is similar to the indicators used with respect to other displays on the panel. When a particular operation is selected such as the clock set, indicator 15 would light up to instruct the operator to insert the year and after it was entered, light 20 of the clock set for the month would light up to provide an indication for entering the month. The operation would continue from left to right with the subsequent energization of the lights 21 and 22 in sequence as the day of the month was entered and then the time. The same type of operation takes place for other data entries of the load management panel.

The time of day programming is accomplished at 23 wherein one of the twenty loads shown at the outputs 24 would be selected and the on and off times for that particular load for any day of the week could be entered into the program by the input 12. A similar input for the demand limits can be entered at 25 to provide the two setpoints, deadband, and scale factor for any loads connected to the output 24.

The duty cycle for any one of the twenty loads connected to the switches or outputs 24 are programmed at 30 using the instructions shown at 31. For a particular interval selected, the off time is selected. The program sequence would be similar to that described in connection with the clock set in that if the duty cycle operation was selected by button 32, light 33 would be energized to tell the operator to select a load which would be entered by input 12 and shown at the indicator 13. After the load was selected light 34 would be energized to inform the operator to select the interval in minutes and thereafter with lights 35 and 40 the off long time and the off short time would be selected as shown in the lower portion of 31 for heating and/or cooling relays.

With certain loads connected to the outputs 24, a temperature sensor may be used to provide a signal to allow the device to select the proper duty cycle program for that particular load based on the user's program for that temperature. Depending on whether the output switch or relay was a heating or cooling relay the limits of temperature (such as outdoor temperature using 54 in FIG. 4B) can change the duty cycle selected as shown at 41 in FIG. 1B. Temperature 1 and temperature 2 are selected to determine whether the load should have no off period, a short off or a long off period.

Figure 1A:
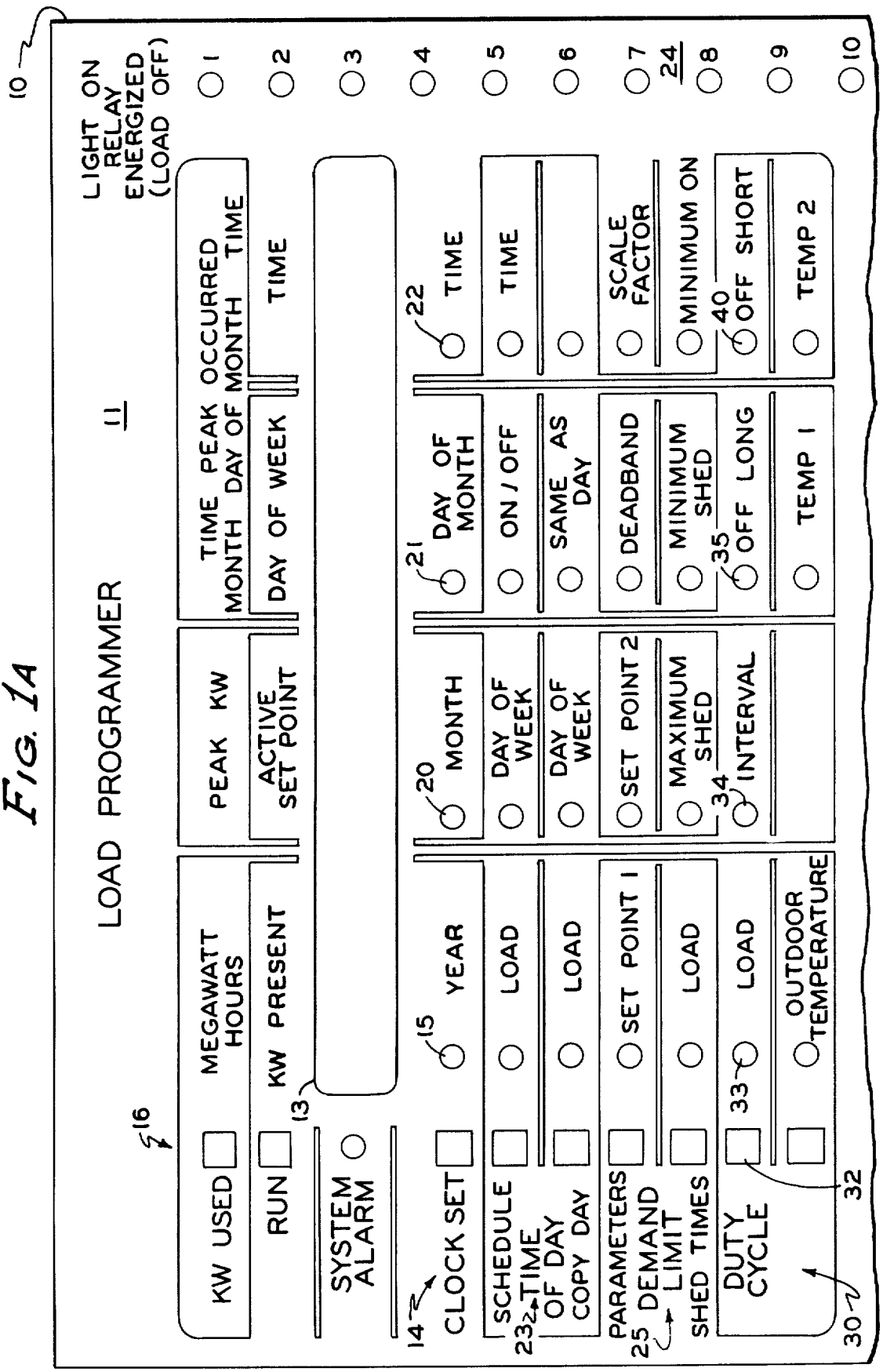
FIG. 1 which is a composite of FIGS. 1A and 1B is a showing of the front panel of a typical load management control apparatus using the present invention.
Figure 1B:
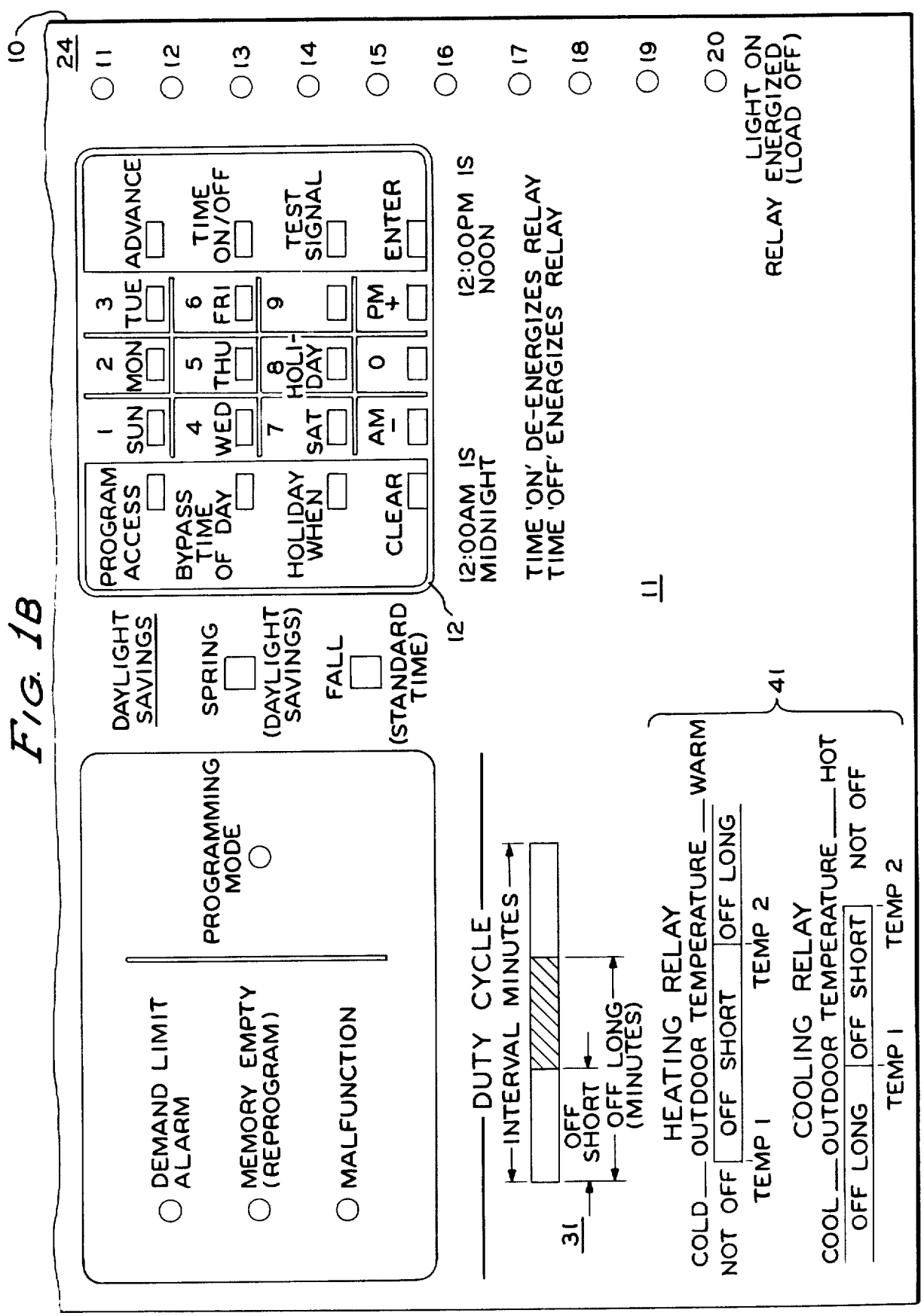
Figure 2:
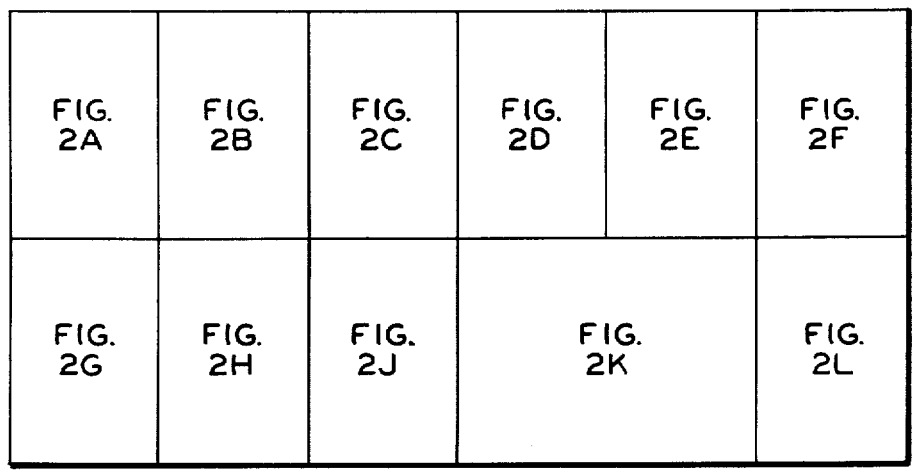
FIG. 2 is an composite of FIGS. 2A to 2M, which is a circuit diagram of the load management control apparatus central processing unit contained in the panel of FIG. 1.
Figure 2:
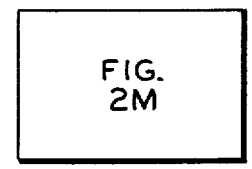
Figure 2A:
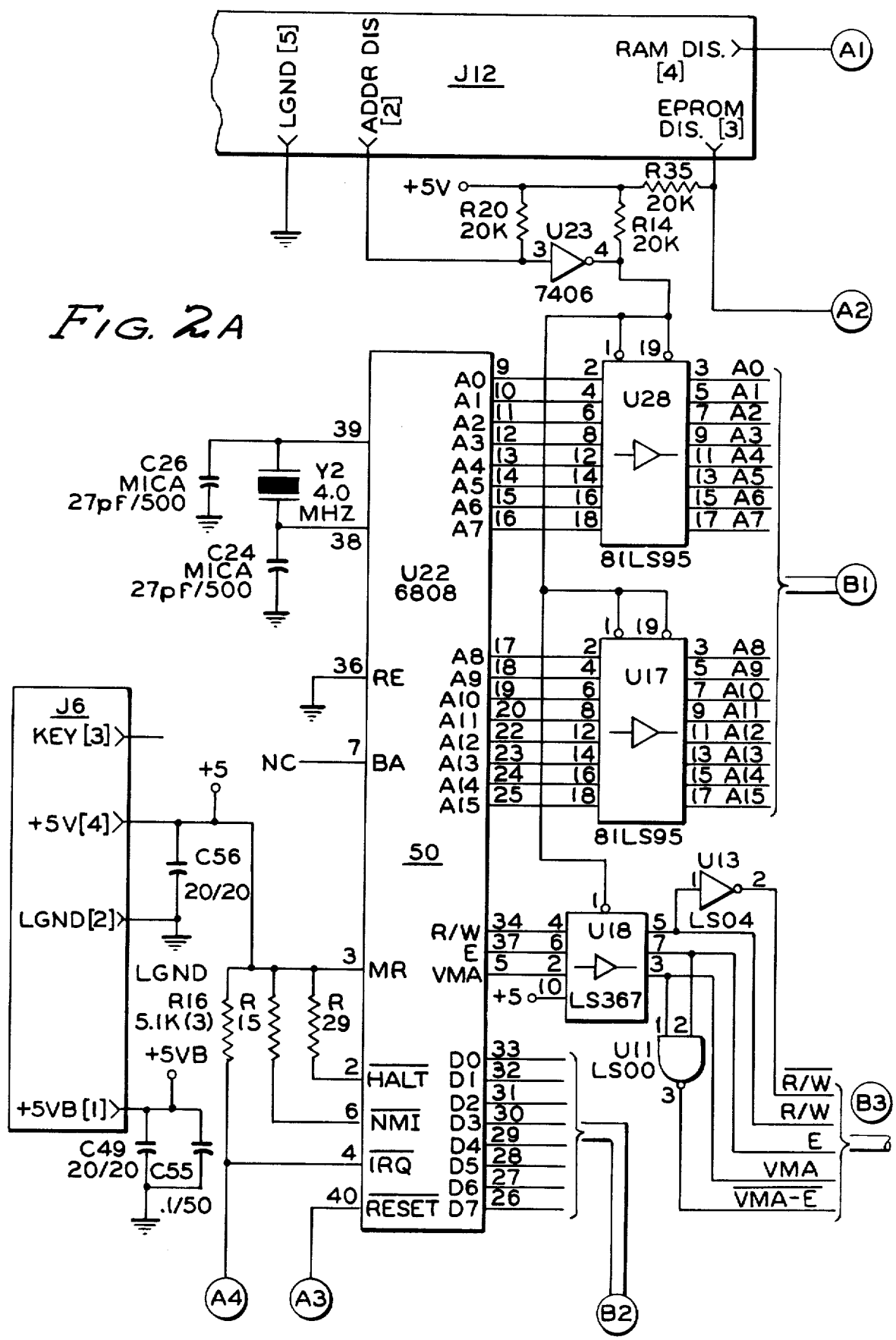
Figure 2B:
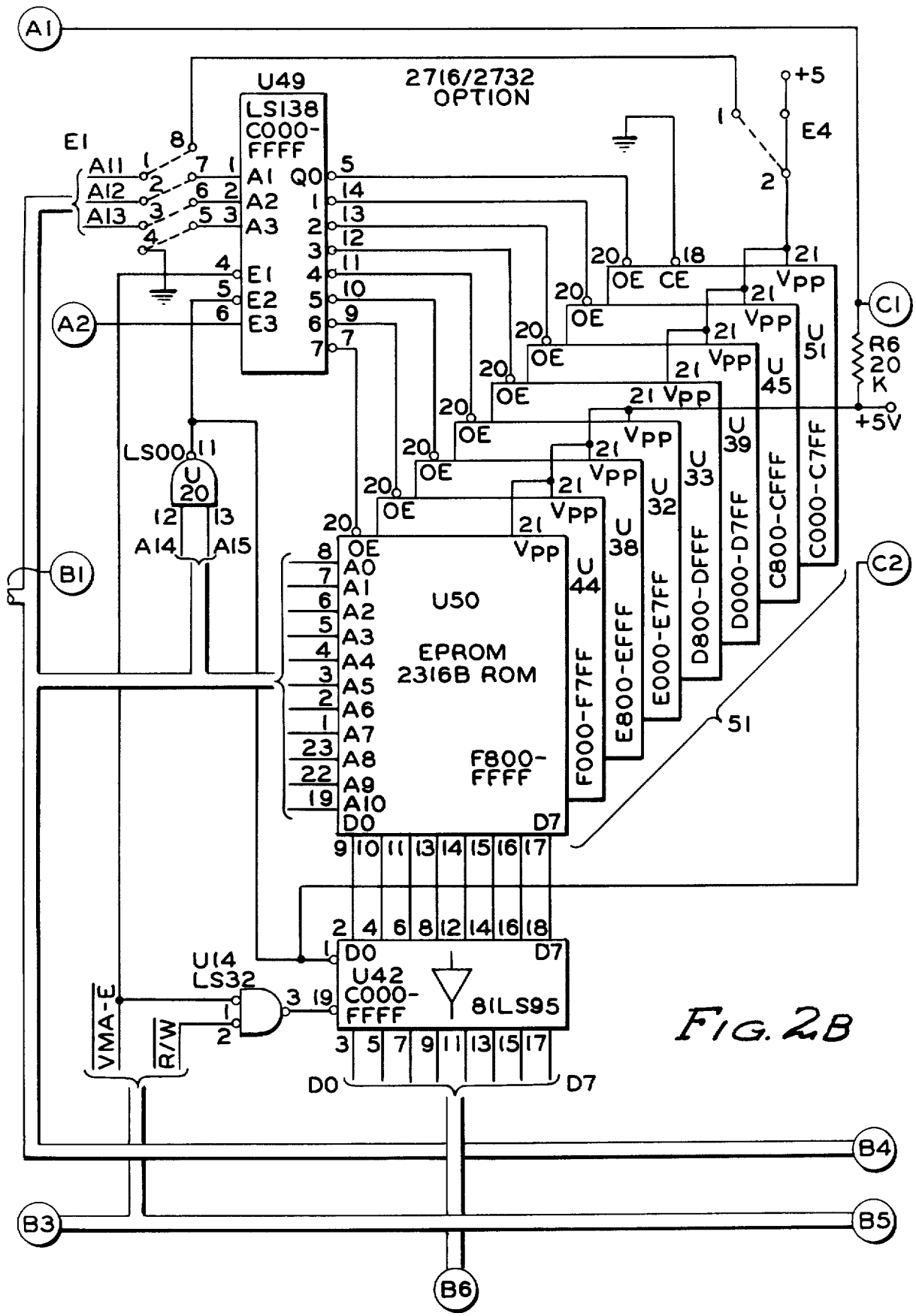
Figure 2C:
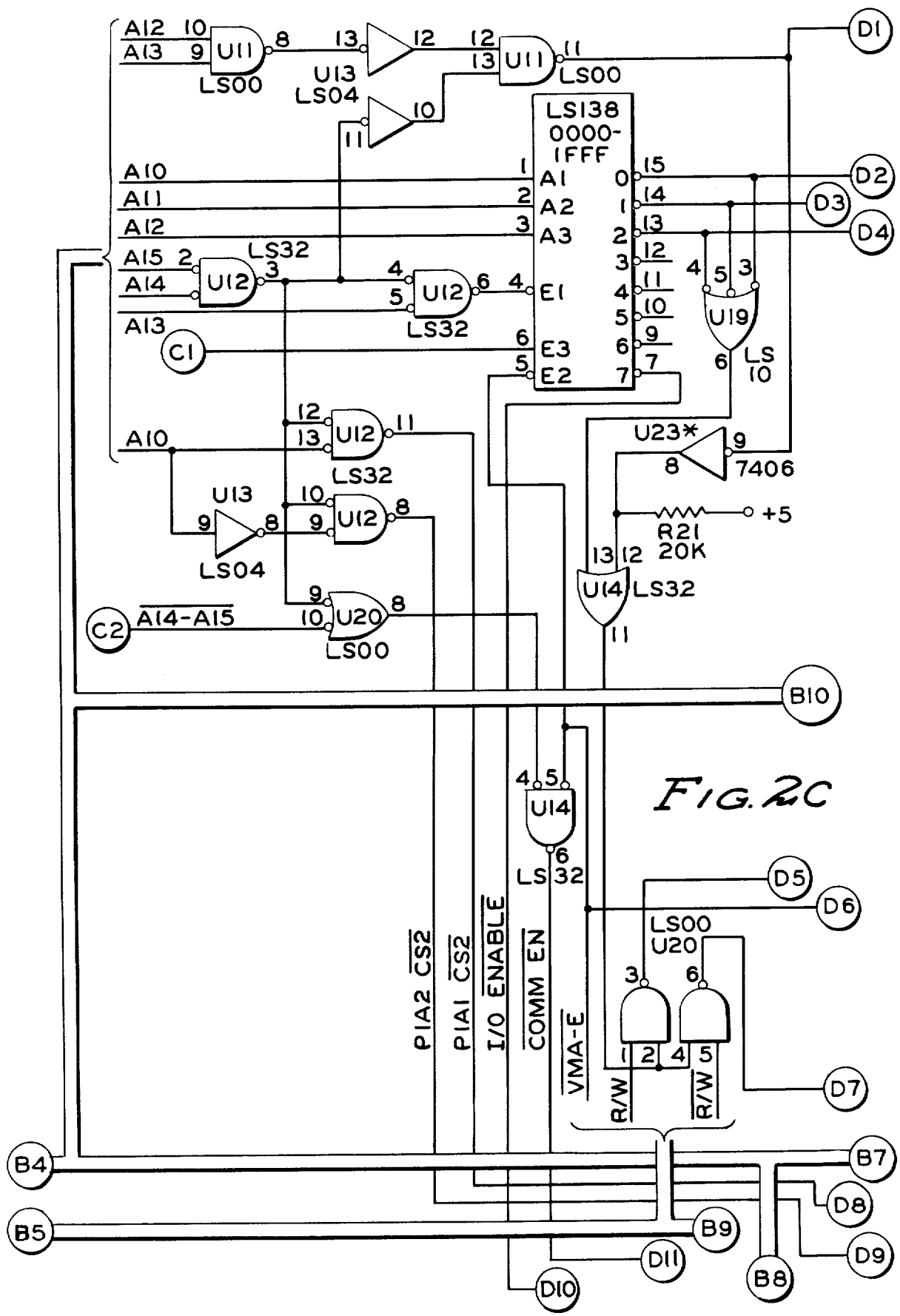
Figure 2E:
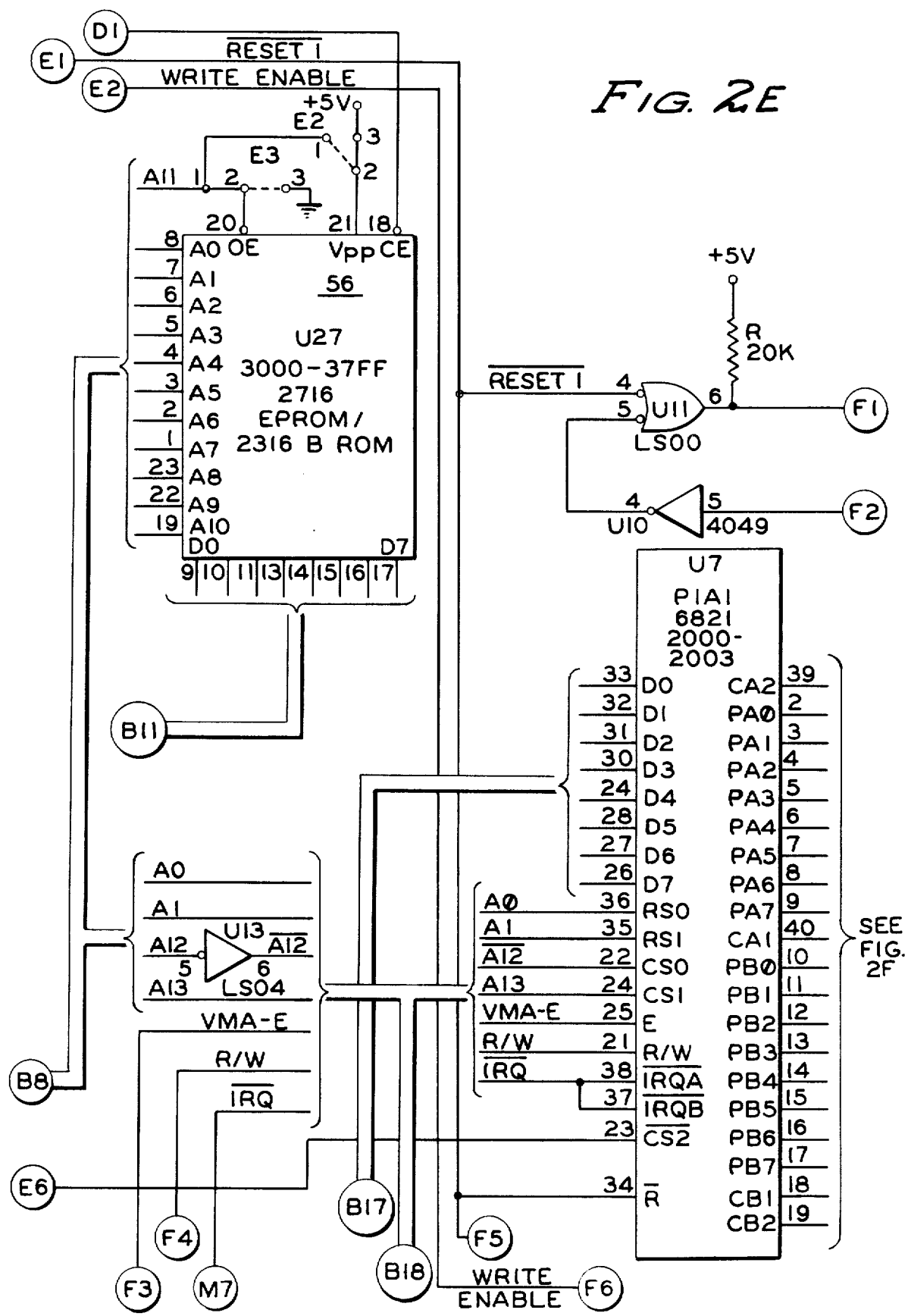

Referring to FIG. 2, a portion of the circuit of the load programmer apparatus contained in the panel of FIG. 1 is shown. A conventional microprocessor 50 (FIG. 2A) is programmed to provide certain programmable sequential operations which are derived from the fixed memories 51 (FIG. 2B) and 56 (FIG. 2E) which have a program as shown in the charts of appendix 1.

Figure 2F:
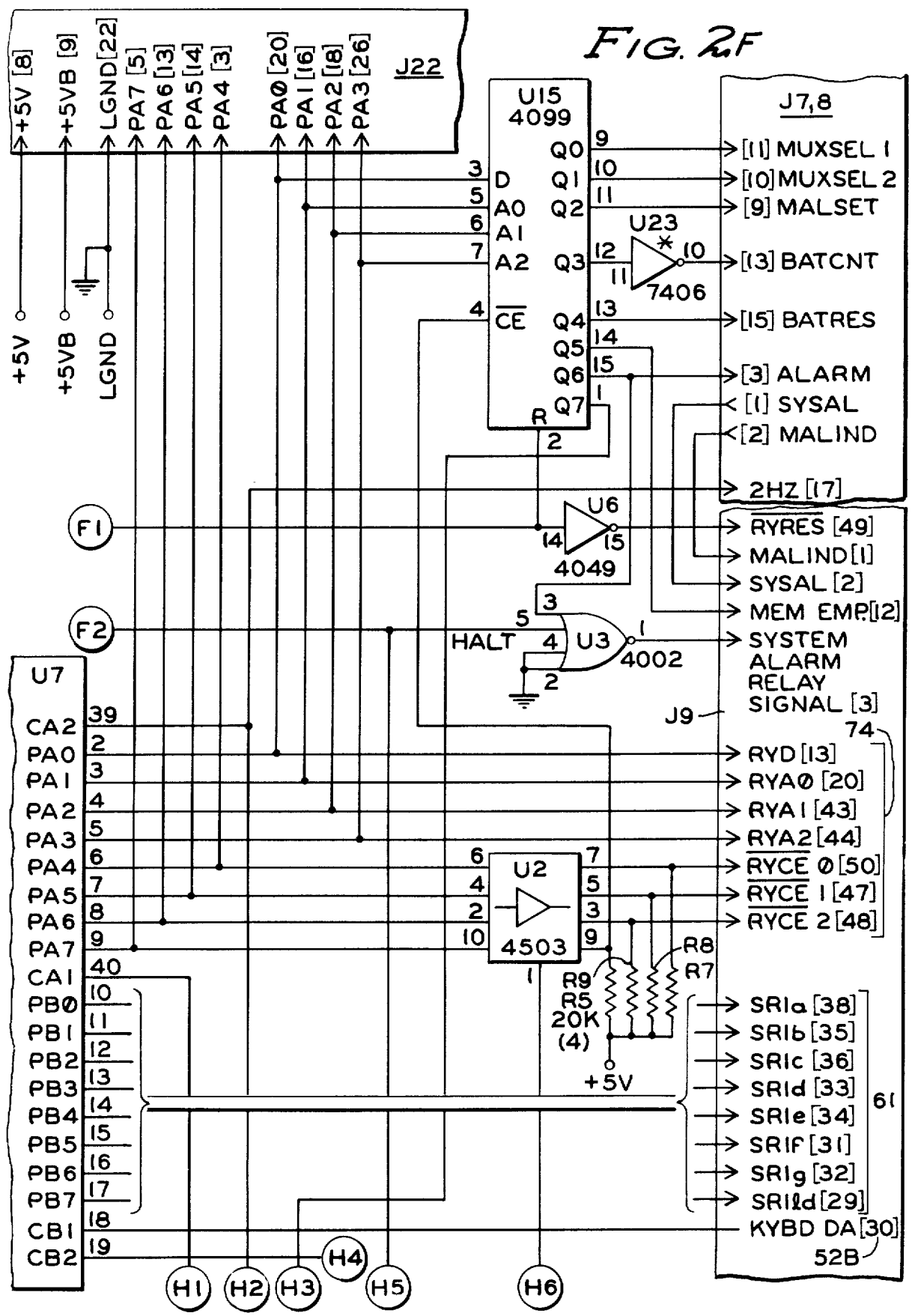
Figure 2G:
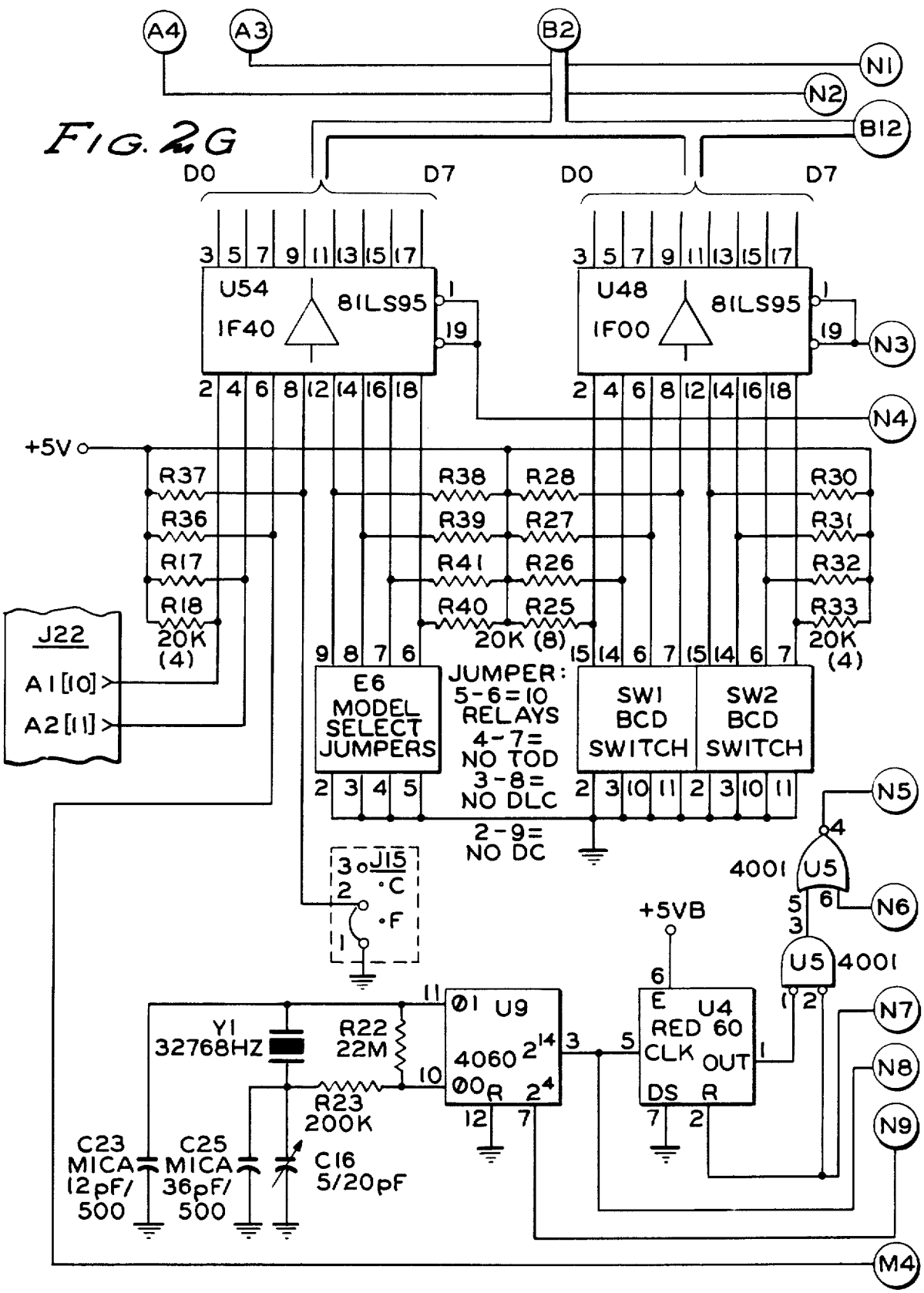
Figure 2H:
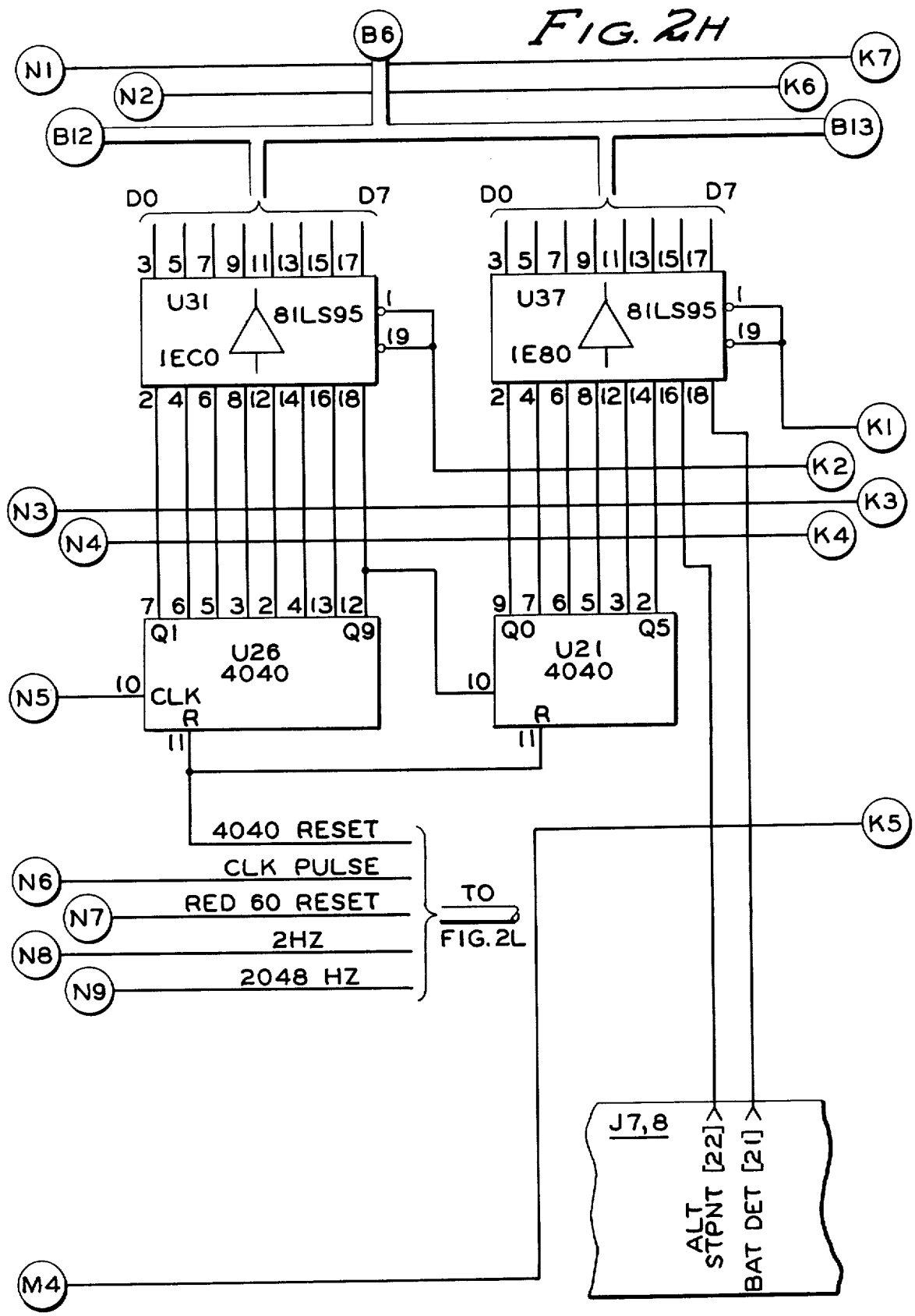
Figure 3A:
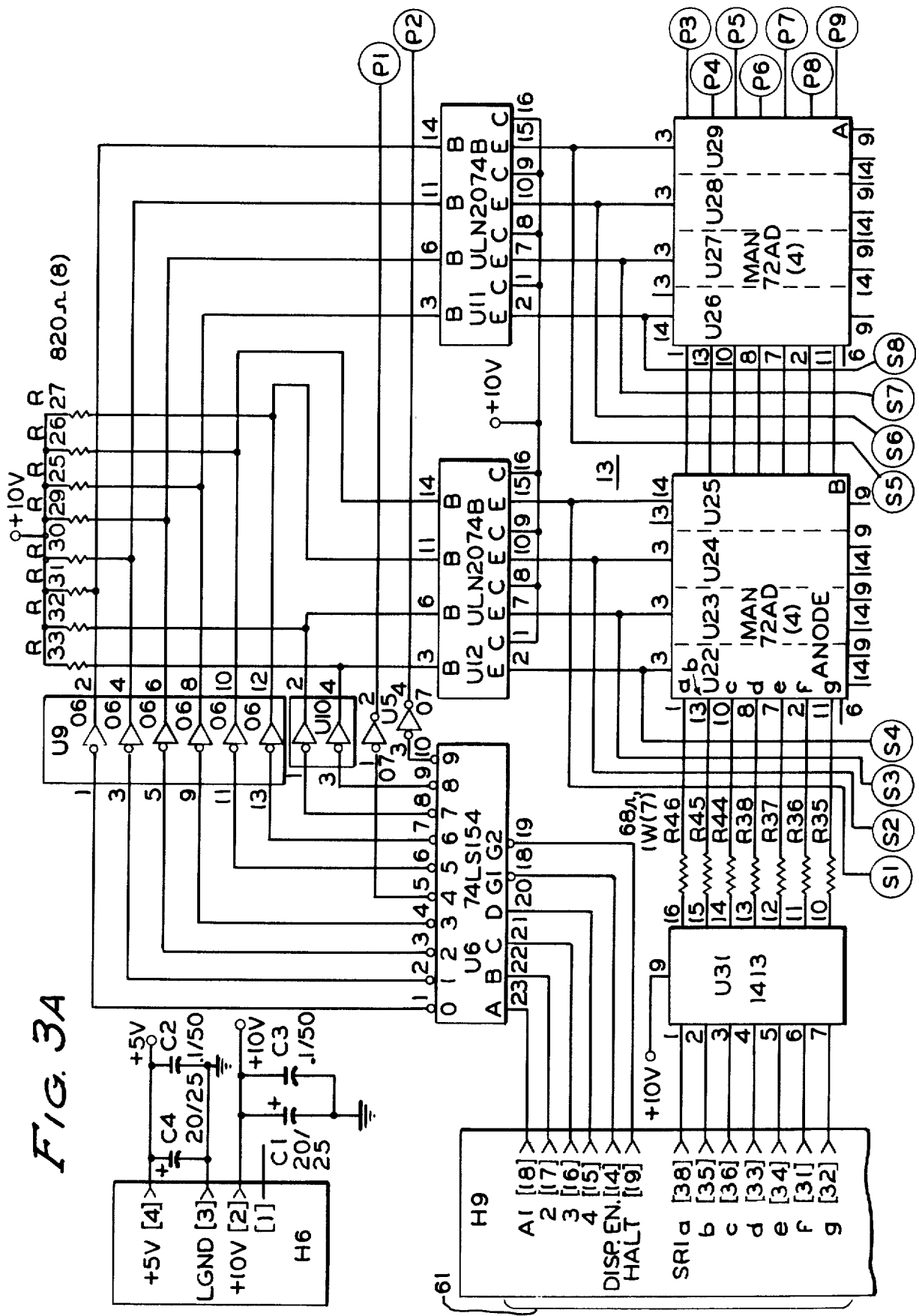
Figure 3B:
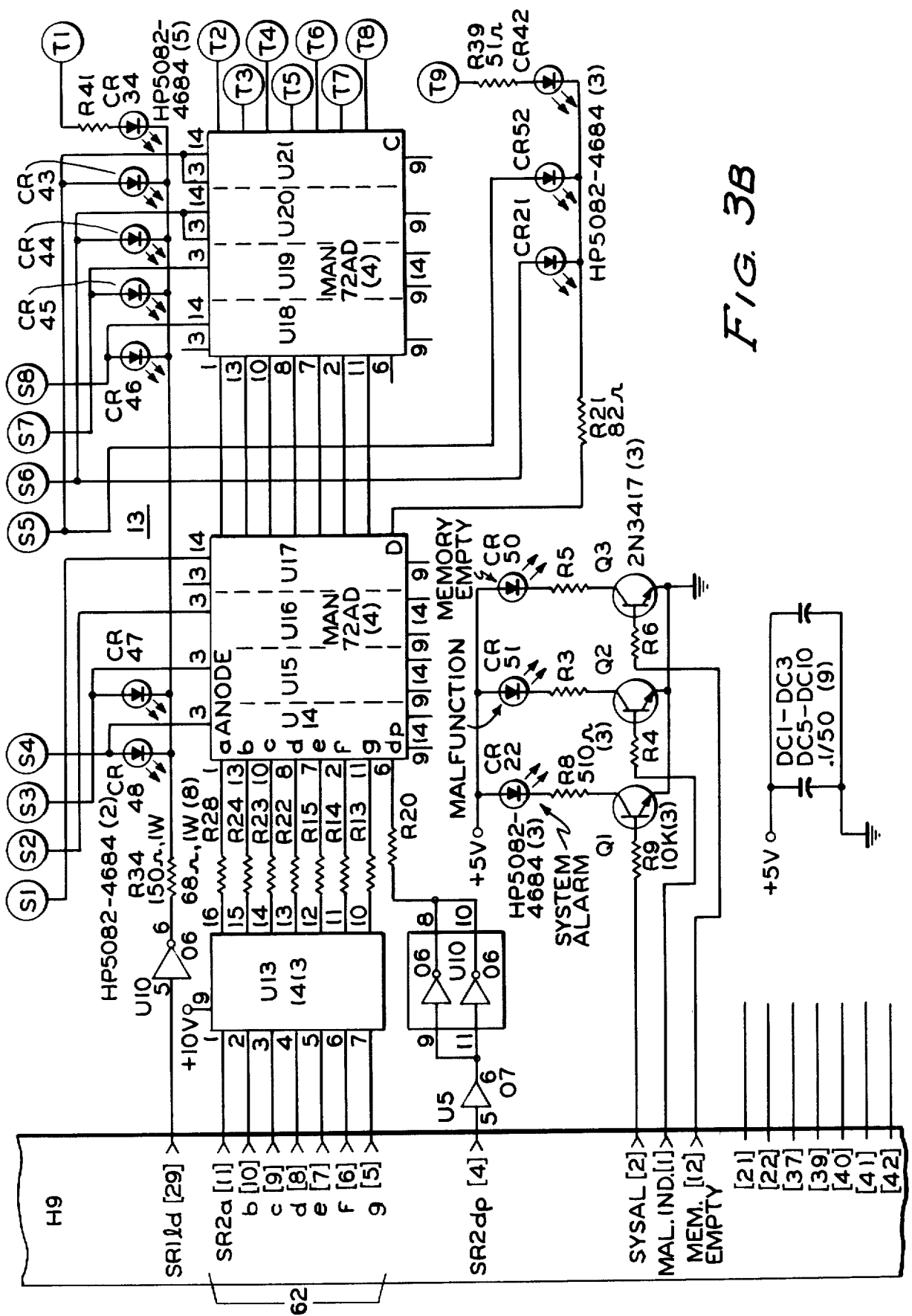
Figure 3C:
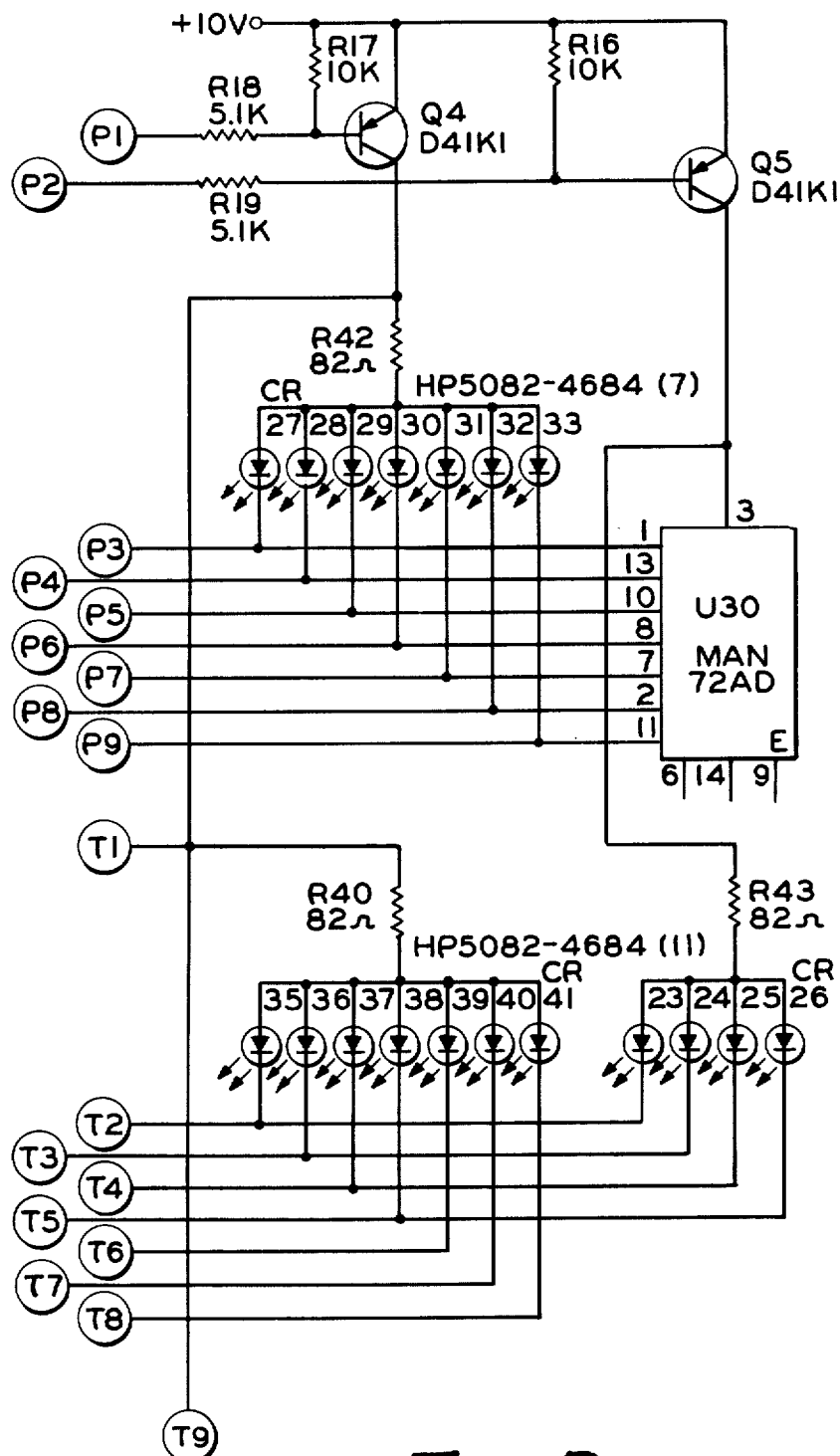
Figure 3D:
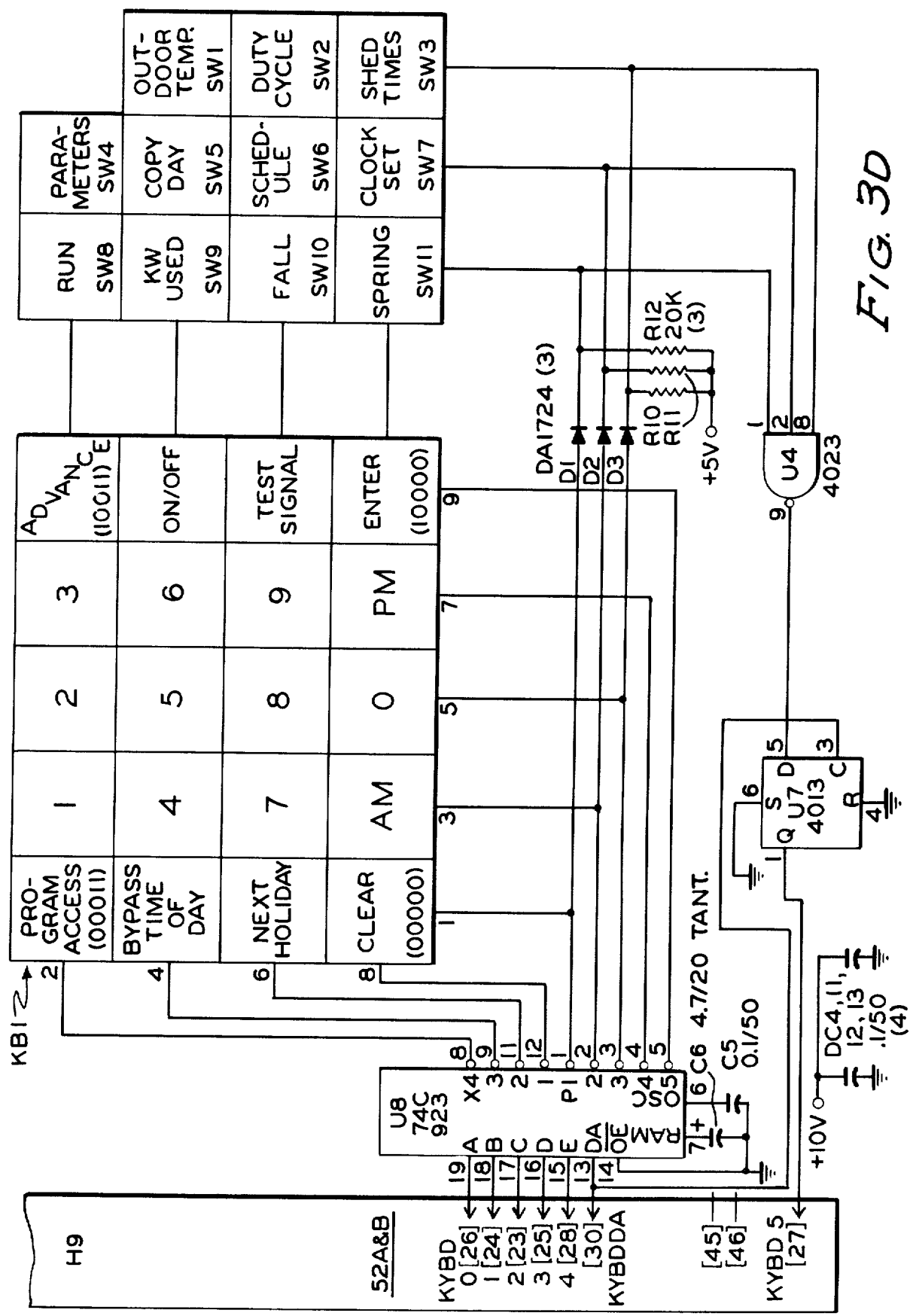
Figure 3E:
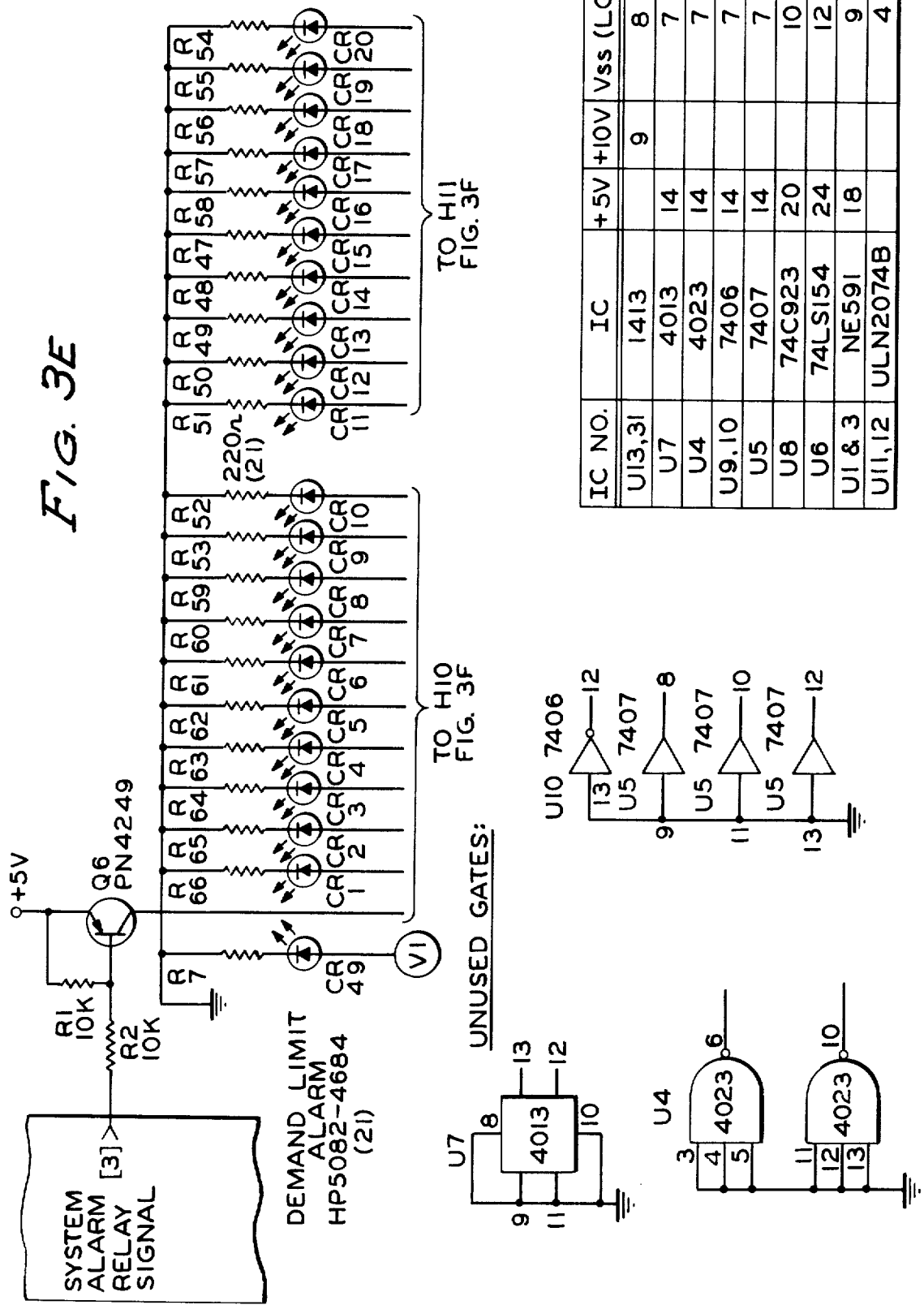
Figure 4A:
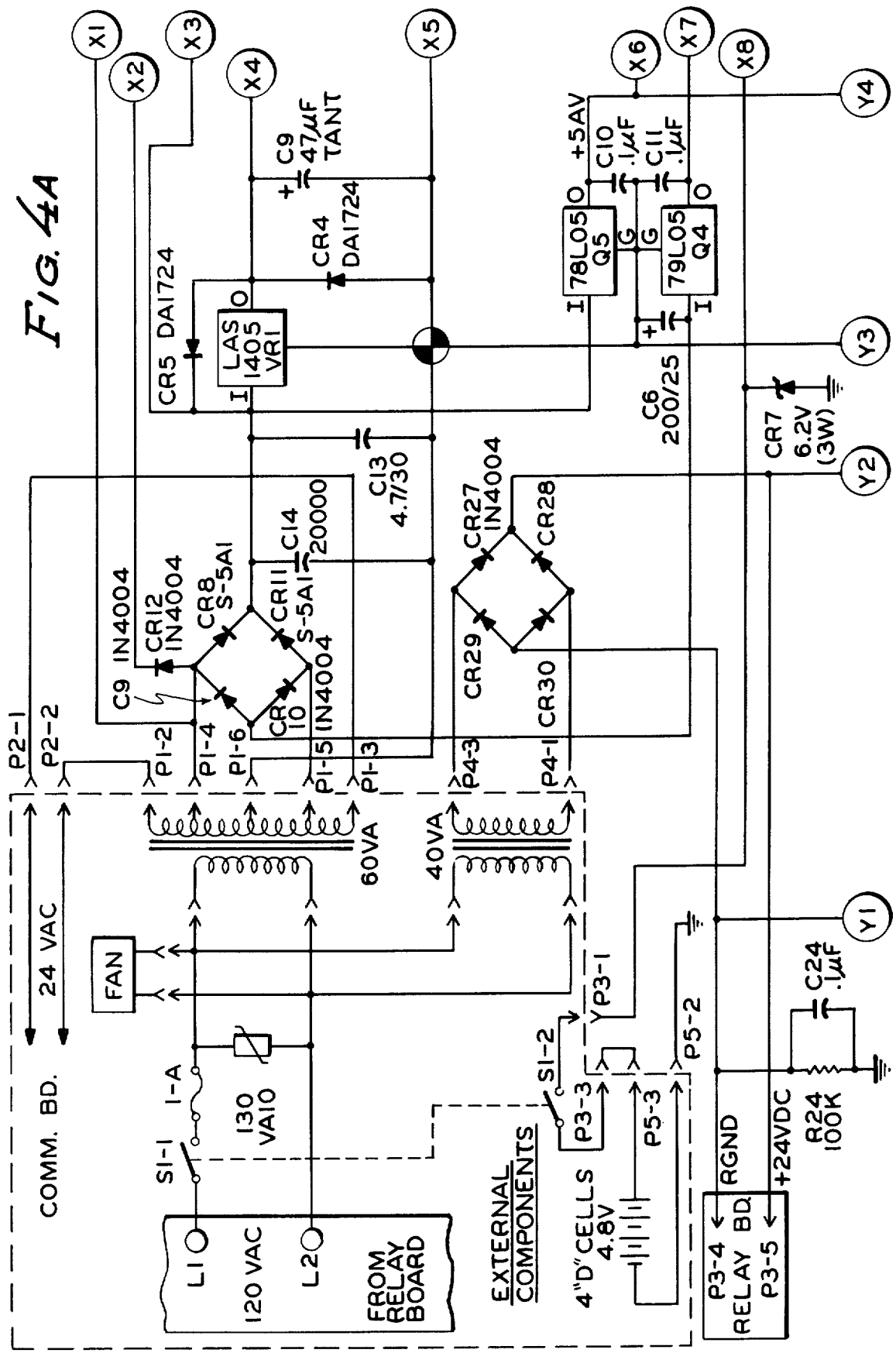
Figure 4B:
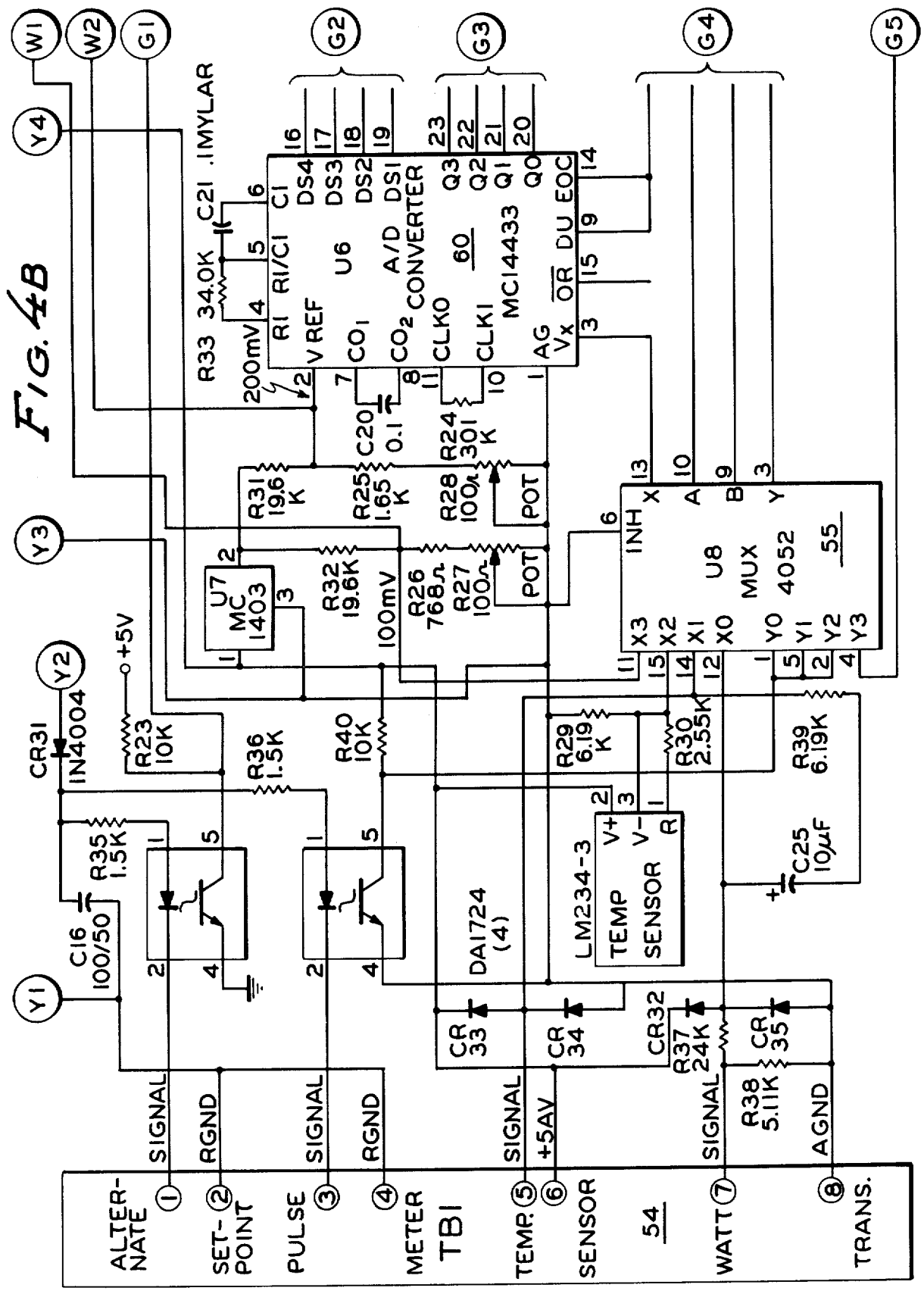
Figure 4D:
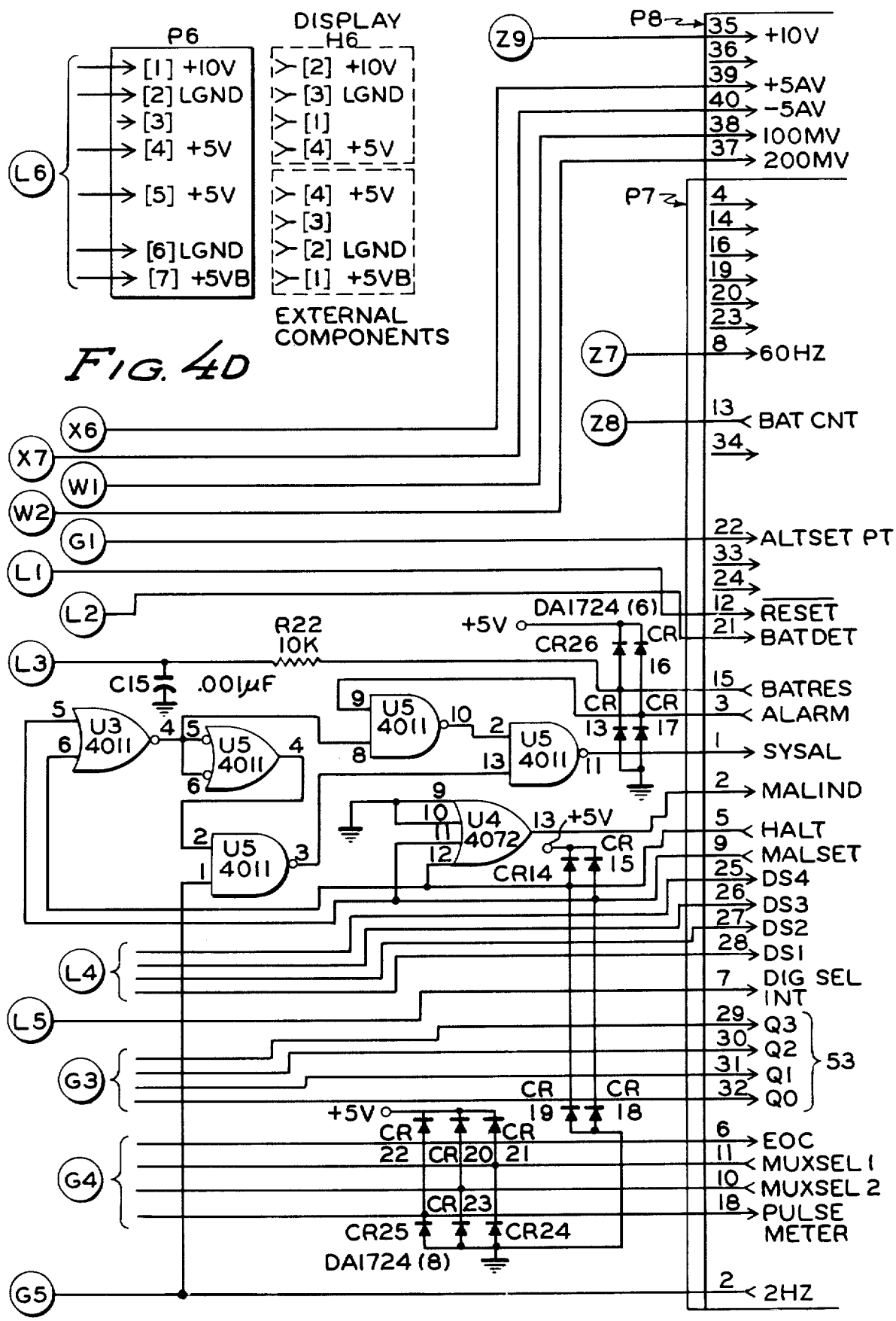
Figure 4E:
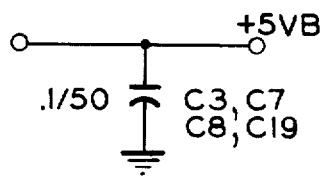
Figure 4E:
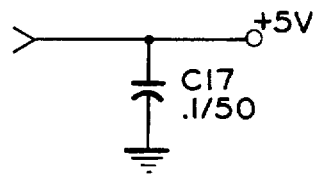
Figure 4E:
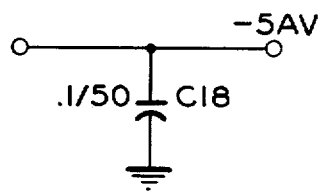
Figure 4E:
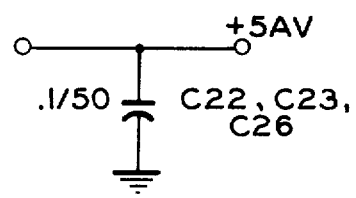
Figure 4E:
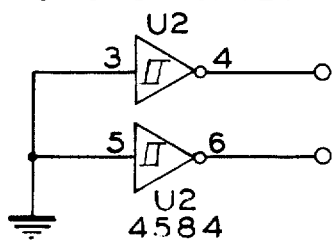

Information from the keyboard 12, which is shown in detail in FIG. 3D and is connected at 52A and 52B to the central processing unit of FIGS. 2J and 2F, can be fed into the program for the time of day operation, demand limit control operation and the duty cycle operation. Referring to FIG. 4B, a outdoor temperature sensor of a conventional type, such as a national semiconductor corporation #LM234 having an output which varies with temperature would be connected to terminal 54 (FIG. 4B) and by means of the multiplexer 55, its signal would be passed through the analog to digital converter 60 and provide a binary decimal code output at 53 (FIG. 4D) for the central processor unit. Connected at 53 of the main central processor unit in FIG. 2J is the output in binary decimal code (BCD) from the terminals of the circuit shown in FIG. 4D.

Figure 2L:
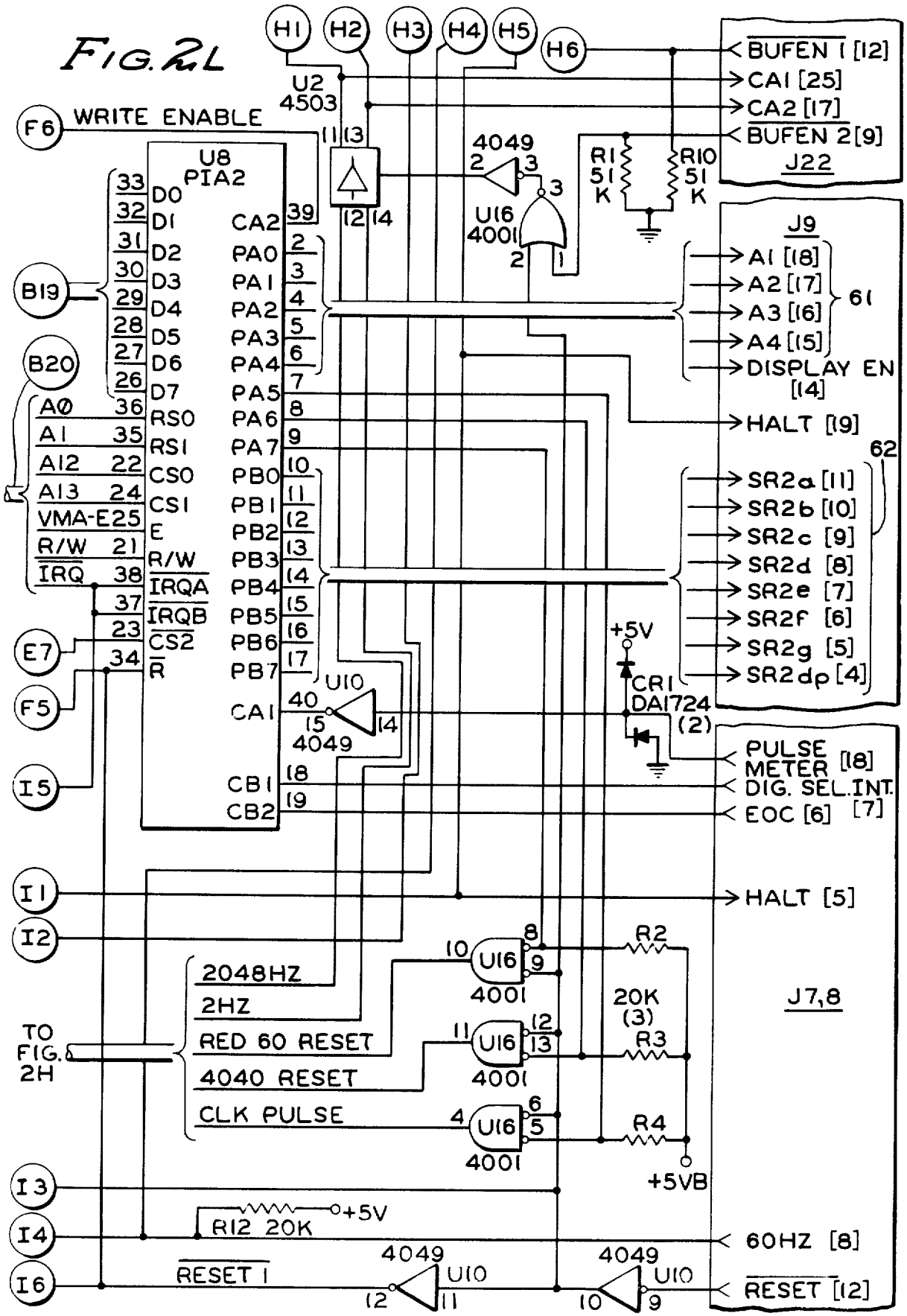
Figure 2M:
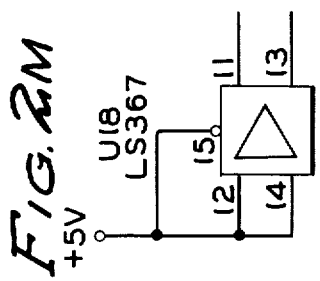
Figure 2M:
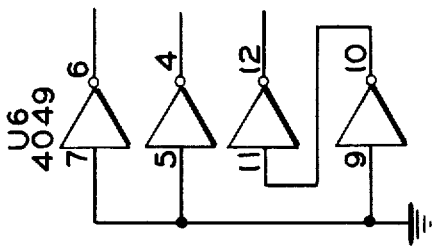
Figure 2M:
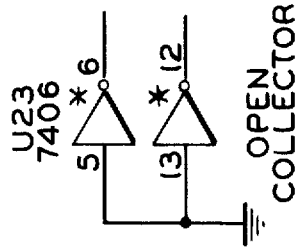

The indicator 13 which is shown in FIGS. 3A and 3B having a plurality of LED's is energized through the input in FIG. 3 at 61 (FIG. 3A) and 62 (FIG. 3B) which is connected to the output of the central processor unit of FIG. 2L at 61 and 62.

Figure 3F:
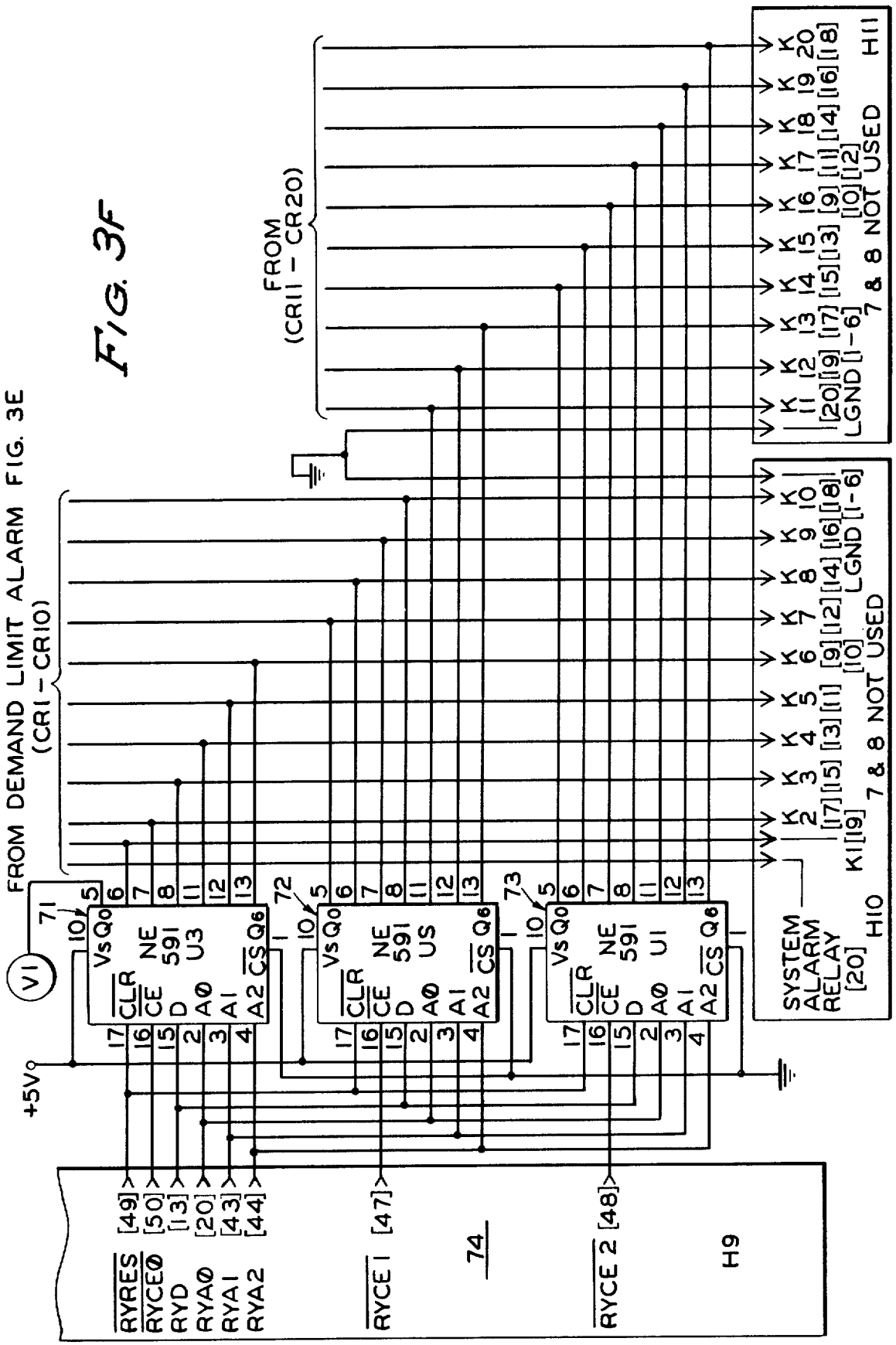

The various loads or outputs 1 to 20 at 24 of FIGS. 1A and 1B are shown at 24 in FIG. 3F to be provided through the drivers 71, 72 and 73 which are connected to the input 74 which is connected to the output 74 of FIG. 2F of the central processor unit.

OPERATION OF THE PREFERRED EMBODIMENT

By means of the input panel 12 as shown in FIG. 1, a duty cycle to select the time off during a certain interval of time for a plurality of loads connected to the input 24 is selected in a conventional manner. The button 32 would be pushed to energize the indicator or LED 33 which would call for the selection of a load at the indicator 13. Assuming that load 1 was entered by input panel 12, upon pushing the enter button, the indicator 34 would light up signaling the operator to choose the time interval for that particular load which is selected and indicated at 13. After the interval was entered, either the off long or off short time would be entered. If the particular load had an outdoor temperature relationship, a duty cycle could be selected depending upon the temperature and whether it was a heating or cooling relay as shown in the drawing at 41 by the insertion of the temperature 1 and temperature 2 into the program. For example, for a heating relays, temperature 1 is selected as the temperature of outdoor temperature sensor 54 of FIG. 4B at which the device switches the duty cycle program from no off time to a short off time and temperature 2 is the temperature of sensor 54 at which the duty cycle program is switched from a short off time to a long off time. Thus it is apparent that this particular load would have a changing duty cycle as the temperature of sensor 54 changed.

Assuming that the duty cycle user program was as follows and each of the loads was programmed by the same type of operation as mentioned in connection with load 1 above.

| Load | Interval | Off-Time | % Off (as decimal) |
|---|---|---|---|
| 1 | 8 | 4 | .50 |
| 3 | 16 | 4 | .25 |
| 4 | 4 | 2 | .50 |
| 5 | 16 | 13 | .81 |
| 6 | 32 | 16 | .50 |
| 9 | 16 | 8 | .50 |
| 10 | 32 | 6 | .20 |
| 14 | 8 | 7 | .87 |
| 17 | 8 | 5 | .62 |
| | | | 4.75 → 5 |

By means of the central processor unit, the percent off time of all of the loads which are placed on duty cycle is summed and the total rounded off to the closest integer. This integer is taken as the number of loads which should be always off as the central processor sequences through the loads of the duty cycle. In the above example using the next highest integer five loads would be maintained off at all times. As the central processor started, loads 1, 3, 4, 5 and 6 would be off and the remaining loads would be on and after a predetermined time period such as 2 minutes, load 4 would be turned on and load 9 turned off to maintain the number off at 5.

The central processor continually looks at all loads which are controlled. If a particular load which is programmed to be duty cycled is turned off, by the Demand Limit Control (23 of FIG. 1A) and or Time of Day Control (25 of FIG. 1A), this load would be considered as an off load for the total duty cycle percent off summation. Thus for example, if the demand limit control turned off load 14, the duty cycler control would recognize this as one of the off loads and, on the next survey of the system operation, (which occurs every minute) would skip the next load to be duty cycled off (which would be load 10) when load 1 turned on after its 4 minute off time. While loads already off due to the time of day program would not be used in calculating the number of total loads to be cycled off by the duty cycle program, loads that are off due to the demand limit control (if programmed for duty cycling) would be counted to keep the average power consumption of the system rather stable. Thus, priority control of loads programmed for duty cycling is given to the demand limit control which is allowed to hold the load off as long as necessary (until power consumption falls below the demand limit control set-point). Without this interfacing function between duty cycler and demand limiter the total energy management function would become more aggressive and turn off more loads than necessary, thus reducing production output unnecessarily.

The shed sequence will begin by shedding the lowest number of loads first and as each scheduled off time expires, the load would be restored. Thus in our example, load 1 is restored after four minutes of off time and the processor brings about the operation of the output for load 9, if there were no other loads off due to the demand limit control, to maintain the total number of loads off at 5. This sequence would continue until all program loads had been sequenced off and then the sequence would repeat. The program of the central processor provides that loads to be shed would be selected in accordance with the longest elapsed times since the shed interval of the preceding shedding operation was completed. This would provide for a rotation of the duty cycle operation among the loads in with equality.

The present invention is proposed for use in the W7010/20 Load Control Panel to be sold by the applicant's assignee in the form shown in the planned instruction sheet 71-4100.

When a change in the loads turned off is to take place said operational means adds or reduces the number turned off in a delayed manner such as one per every tenth of a second until the number of loads turned off is equal to the integer.

The embodiments of the invention in which an exclusive property or right is claimed are defined as follows:

1. In a load management control apparatus comprising,
   a plurality of switch means adapted to control individual loads for individual duty cycles of a predetermined off time for each operating time interval,
   means connected to said switch means for programming the operation of said switch means to select a percentage off time and an operating time interval for certain of said switch means and thus its load,
   means connected to said means for programming for determining the total percentage of off time of all the loads which are being duty cycled and rounding this number off to the closest whole number, and
   control means connected to said means for programming for always maintaining the number of loads off the same as said whole number.

2. An improvement in a load management control apparatus having programmable means to duty cycle a plurality of loads in a sequential operation to turn off each load a selected predetermined percentage of the time interval selected for the operation of each load, the improvement comprising,
   means to determine the percentage of off time of the time interval of each load which is being duty cycled,
   means to determine an integer of the total of said percentage of off time of all of said loads being duty cycled, and
   means to modify the sequential operation of said programmable means to maintain the number of loads, being duty cycled, in an off operation at any one time equal to said integer.

3. In a load management control apparatus comprising, a plurality of output means each adapted to control an individual load,
   sequential operational means connected to said plurality of output means for selectively programming the operation of certain of said output means to turn off certain of said loads in a sequential operation for a predetermined percentage of a predetermined time interval of that load, depending on the particular duty cycle selected for that load,
   means connected to said operational means for determining the total percentage of off time of the interval of each load of all the loads having a duty cycle program,
and
   means for modifying the sequential operation of said sequential operational means to turn off at all times a number of loads equal to the closest integer of said total percentage.

4. The invention of claim 3 wherein,
   temperature responsive means associated with certain of said output means and thus the loads,
   said sequential operational means having means to program the off operation of certain of said output means depending on the temperature operation limits selected by said temperature responsive means associated with its load,
   said means for modifying the sequential operation of said sequential operational means being operative with loads which are in said off condition by being duty cycled at said moment and loads which are in said off condition by a duty cycle operation depending on said temperature limits; whereby,
   upon the occurrence of a temperature change by said responsive means to change the duty cycle of any one load, said percentage of off time is changed to reflect the number of loads to be turned off at all times by said sequential operational means.

5. The invention of claim 3 wherein
   said sequential operational means comprises,
   timing means responsive to the operational elapsed time since the particular load interval was completed for each of said loads,
   and means connected to said operational means including said timing means for each load to compare the elapsed time of all loads and sequence as the next load, the load having the longest elapse time.

6. The invention of claim 3 wherein,
   means associated with any one of said plurality of output means to result in turning off that particular load provides for an input to said sequential operational means to choose which of said loads will be used in the consideration in the selection of the number of loads to be turned off at all times.

7. The invention of claim 3 comprising
   operational condition responsive means connected to respond to the operational condition of each of said output means, and
   means connecting said condition responsive means of each duty cycled load to said sequential operational means to prevent operation of any one output means to an on position until the selected off interval has expired.

8. The invention of claim 3 comprising,
   time of day control apparatus for selectively turning certain switch means and thus its load off during selected time periods, and
   means connecting said control apparatus to said operational means to remove said time of day loads from being used by said sequential operational means when said total percentage of off time of duty cycle loads is determined.

9. The invention of claim 3 comprising demand limit control apparatus for selectively turning certain switch means and thus its load off during certain times in response to the total power demand of all of the loads, and means connecting said control apparatus to said operational means to add said loads to be used by said sequential operational means as the number of loads equal to said integer.

10. The invention of claim 3 comprising delay means connected to said means for modifying the sequential operation of said sequential operational means to delay a change in said number of loads turned off to match said integer when said integer changes.

11. The invention of claim 10 comprising means connected to said delay means to only allow for a change in the number of loads turned off at one load at a time.

* * * * *